Demming & Walker,
Cage Trap.
N° 31,651. Patented Mar. 5, 1861.
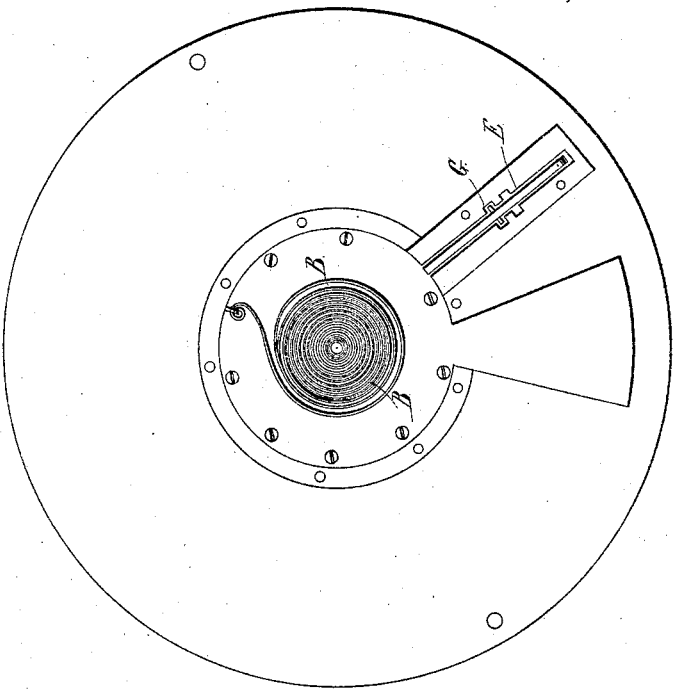
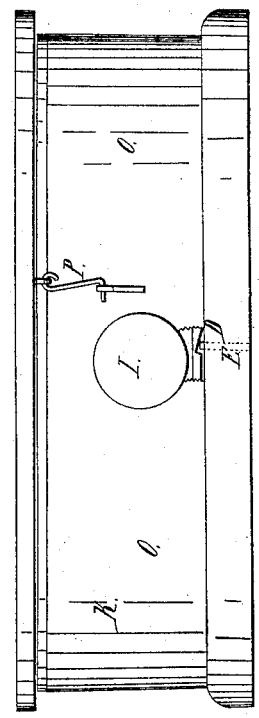
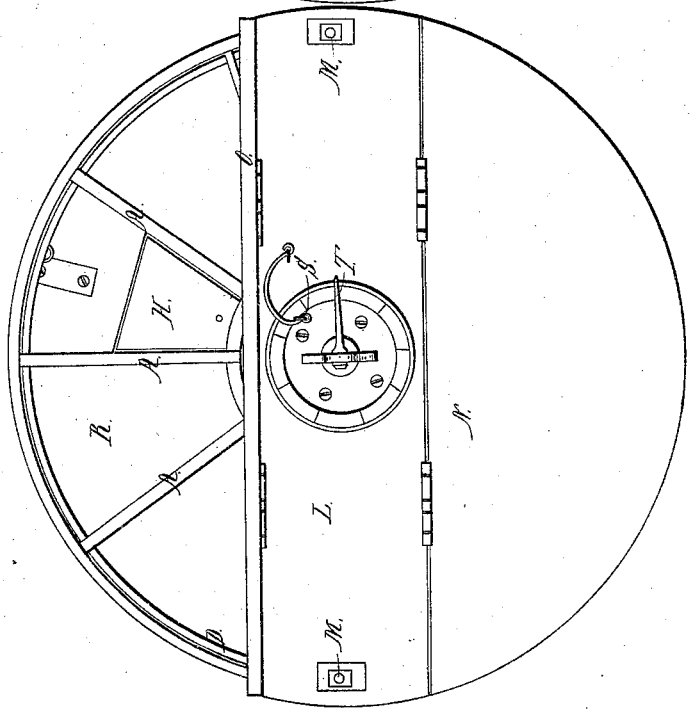

UNITED STATES PATENT OFFICE.

H. D. DEMING AND P. G. WALKER, OF DELMAR, PENNSYLVANIA, ASSIGNORS TO P. G. WALKER AND WESLEY PITTS, OF CHARLESTON.

ANIMAL-TRAP.

Specification of Letters Patent No. 31,651, dated March 5, 1861.

*To all whom it may concern:*

Be it known that we, HIRAM D. DEMING and PETER G. WALKER, of Delmar, in the county of Tioga and State of Pennsylvania, have invented a new and useful Improvement in Traps for the Destruction of Rats, Mice, Squirrels, &c.; and we do hereby declare that the following is a full and exact description thereof, reference being had to the accompanying drawings and to the letters of reference marked thereon.

Our invention consists in a peculiar construction and arrangement of a rotary self setting trap for animals.

In the accompanying drawings, Figure 1, is a front elevation of our trap. Fig. 2 is a top view of the same. Fig. 3, is a view of the bottom of the trap, the finishing plate being removed in order to show the coiled spring and tripping lever.

The box portion of our trap is very simple, yet efficient and durable. A circular piece of board or disk forms the bottom of this box; and the side wall K, Fig. 1, consists of a piece of sheet metal bent to fit the bottom board. These and the central top piece L, are all fastened together by two bolts M, running outside of the wall K. The top is completed by two hinged pieces N, and O, by means of which the compartments may be opened at pleasure. The piece or lid O, Fig. 2 (seen turned up edgewise) is provided with a glazed window in order that the animal may better see the bait, and also may have less fear in entering the trap; this window also serves for the inspection of the trap. Within this circular box is a series of revolving radial partitions A, Fig. 2, dividing the trap into any desired number of compartments. These partitions are attached to a central shaft, to which the flat coiled spring B, Fig. 3, is also attached. By means of a key C, Fig. 2, the central shaft is turned, carrying the partitions and winding up the coiled spring B.

The extremities of the partitions A, are connected by a metallic ring D, Fig. 1. In this ring is a series of notches into which the tripping lever E, catches, as seen in Fig. 1, thus preventing the spring from unwinding. This lever E is better seen in Fig. 3, its fulcrum being the pin G. The end of this lever which is next to the spring B, is connected by a link to trip H, Fig. 2, which is also balanced on fulcrum G, so as to rock a certain distance. Now the spring being wound up a rat or other animal, upon entering the door I, Fig. 1, steps upon the trip H which being thereby depressed moves the lever E and releases the notch in ring D, Fig. 1, when the spring B rotates the partitions A, pushing the animal away from the door and thus entrapping him at the same time that the trap is set for another animal. In this manner the compartments of the trap come successively in front of door I, securing an animal in each compartment.

In the compartment next to the door I, Fig. 1, is a fall or loose piece in the bottom, seen at R, Fig. 2, which is removable. By withdrawing this loose piece and setting the trap over water, (contained in a pail or other suitable vessel,) an animal will be pushed into the water so soon as the trap springs. In this manner the trap itself drowns the animals and a hundred rats may be caught and killed by once winding the trap. Or by putting the piece R into its place and inserting the pin S, Fig. 2, the trap may go on securing the game until each compartment has a prisoner and the index T, strikes the pin S. Upon approaching the trap, this index T will show how many times the trap has sprung—and thus the number of animals caught, whether the latter are drowned or retained in the trap.

In each compartment a bait hook is placed near the central shaft.

Our trap as above described is especially adapted to catching rats, squirrels and similar animals but it may be varied in size and construction to adapt it to catching minks and other game.

We do not claim the use of a coiled spring, of rotary radial partitions, or a window as such, when employed in traps; but we believe that our arrangement of these in connection with our peculiar box having sheet metal wall, constitutes a new and patentable improvement.

Having thus fully described our invention, what we claim and desire to secure by Letters Patent of the United States is:

The construction and arrangement of the above described trap, the same being provided with the index T, and trip H, and having sheet metal side wall, rotary partitions and coiled spring, all combined and operating together substantially as set forth for the purposes described.

HIRAM D. DEMING.
PETER G. WALKER.

Witnesses:
 A. J. SOFIELD,
 I. S. WATROUS.